(12) United States Patent
Petrescu et al.

(10) Patent No.: US 7,756,347 B2
(45) Date of Patent: *Jul. 13, 2010

(54) METHODS AND APPARATUS FOR VIDEO DECODING

(75) Inventors: Doina Petrescu, Buffalo Grove, IL (US); Trampas Stern, Raleigh, NC (US); Marco Jacobs, Einhoven (NE); Dan Searles, Durham, NC (US); Charles W. Kurak, Jr., Durham, NC (US)

(73) Assignee: Altera Corporation, San Jose, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/671,236

(22) Filed: Feb. 5, 2007
(Under 37 CFR 1.47)

(65) Prior Publication Data
US 2007/0154104 A1 Jul. 5, 2007

Related U.S. Application Data

(63) Continuation of application No. 10/282,925, filed on Oct. 29, 2002, now Pat. No. 7,181,070.

(60) Provisional application No. 60/340,620, filed on Oct. 30, 2001.

(51) Int. Cl.
G06K 9/36 (2006.01)
G06K 9/46 (2006.01)

(52) U.S. Cl. .................. 382/234; 382/236; 382/238
(58) Field of Classification Search .................. None
See application file for complete search history.

(56) References Cited

U.S. PATENT DOCUMENTS 5,557,332 A * 9/1996 Koyanagi et al. ...... 375/240.16

| 5,701,160 | A | * | 12/1997 | Kimura et al. | 375/240.14 |
| 6,236,759 | B1 | * | 5/2001 | Horie et al. | 382/244 |
| 6,542,541 | B1 | * | 4/2003 | Luna et al. | 375/240.01 |
| 6,687,299 | B2 | * | 2/2004 | Yoshida et al. | 375/240.16 |
| 6,868,123 | B2 | * | 3/2005 | Bellas et al. | 375/240.16 |
| 6,870,883 | B2 | * | 3/2005 | Iwata | 375/240.01 |
| 7,039,115 | B1 | * | 5/2006 | Wu | 375/240.26 |
| 2001/0009567 | A1 | * | 7/2001 | Tsuboi | 375/240.25 |

OTHER PUBLICATIONS

Kuroda, I.; Nishitani, T.; "Multimedia Processors", Proceeding of the IEEE, vol. 86, No. 6, Jun. 1998 pp. 1203-1221.*

* cited by examiner

*Primary Examiner*—Yuzhen Ge
(74) *Attorney, Agent, or Firm*—Priest & Goldstein, PLLC

(57) ABSTRACT

Techniques for performing the processing of blocks of video in multiple stages. Each stage is executed for blocks of data in the frame that need to go through that stage, based on the coding type, before moving to the next stage. This order of execution allows blocks of data to be processed in a nonsequential order, unless the blocks need to go through the same processing stages. Multiple processing elements (PEs) operating in SIMD mode executing the same task and operating on different blocks of data may be utilized, avoiding idle times for the PEs. In another aspect, inverse scan and dequantization operations for blocks of data are merged in a single procedure operating on multiple PEs operating in SIMD mode. This procedure makes efficient use of the multiple PEs and speeds up processing by combining two operations, inverse scan (reordering) and dequantization, which load the execution units differently. The reordering loads mainly the load and store units of the PEs, while the dequantization loads mainly other units. By combining the inverse scan and dequantization in an efficient VLIW packing performance, processing gain is achieved.

15 Claims, 9 Drawing Sheets

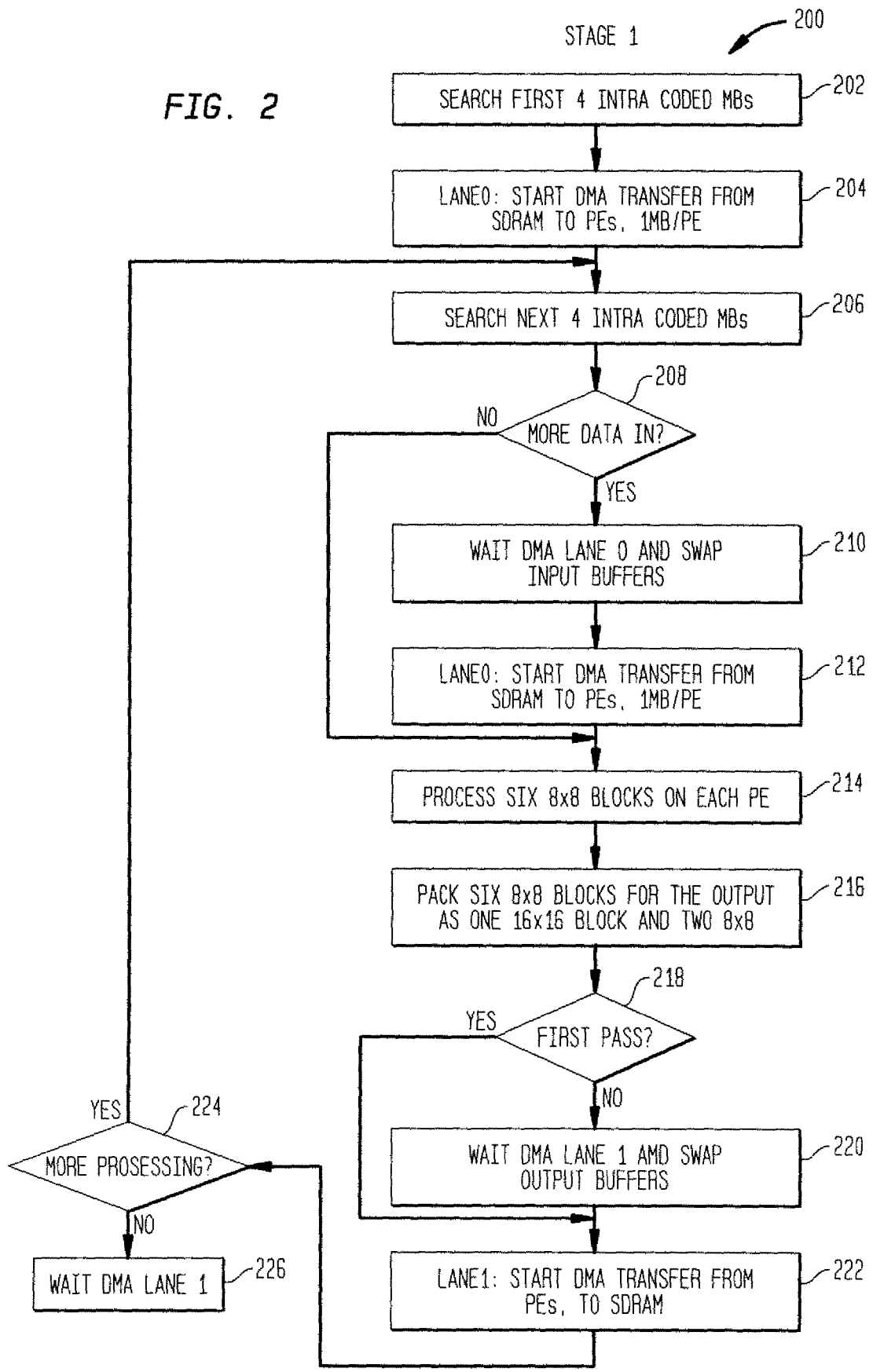

FIG. 6

PMV=MEDIAN(MV1,MV2,MV3)
MV=PMV+MVD

METHODS AND APPARATUS FOR VIDEO DECODING

This application is a continuation of U.S. application Ser. No. 10/282,925 filed Oct. 29, 2002 and claims the benefit of U.S. Provisional Application Ser. No. 60/340,620 filed Oct. 30, 2001, which is incorporated by reference herein in its entirely.

FIELD OF THE INVENTION

The present invention relates generally to improvements in video processing. More specifically, the present invention relates to a system and method for providing improved video decoding.

BACKGROUND OF THE INVENTION

MPEG-4 is an ISO/IEC standard developed by Moving Picture Experts Group (MPEG) and defines compression and decompression techniques for audio and visual data. The MPEG-4 standard is formally known as ISO/IEC-14496 and is incorporated by reference herein in its entirety. In the decoder described by the MPEG-4 reference, blocks of data are processed in a sequential order, irrespective of the coding type of the blocks. For each block of data, the processing stages are selected and executed before processing the next block.

SUMMARY OF THE INVENTION

The present invention provides a system and method for performing the processing of blocks of video in multiple stages. Each stage is executed for blocks of data in the frame that needs to go through that stage, based on the coding type, before moving to the next stage. This order of execution allows blocks of data to be processed in a nonsequential order. Multiple processing elements (PEs) operating, in SIMD mode executing the same task and operating on different blocks of data may be utilized, avoiding idle times for the PEs.

In another aspect, the present invention allows inverse scan and dequantization operations for blocks of data to be merged in a single procedure operating on multiple PEs operating in SIMD mode. This procedure makes efficient use of the multiple PEs and speeds up processing by combining two operations, inverse scan (reordering) and dequantization, which load the execution units differently. The reordering uses mainly the load and store units of the PEs, while the dequantization uses mainly other units. By combining the inverse scan and dequantization in an efficient VLIW packing, performance processing gain can be achieved. Data is loaded from the local memory into registers using reordering indices, packed into 4 halfwords, then processed for dequantization and stored in packed groups of 4 elements. The indices used for loading data (inverse scan indices) are obtained from either of three tables, corresponding to the three different scan orders. The table is selected for each block based on a DC gradient value, as defined by the MPEG-4 standard, calculated prior to this function.

A more complete understanding of the present invention, as well as further features and advantages of the invention, will be apparent from the following detailed description and the accompanying drawings.

BRIEF DESCRIPTION OF THE DRAWINGS

FIGS. 2 and 2A show a method of decoding intra macroblocks in accordance with the present invention;

FIG. 6 shows motion vectors for luminance blocks in accordance with the present invention.

DETAILED DESCRIPTION

Figure 1:
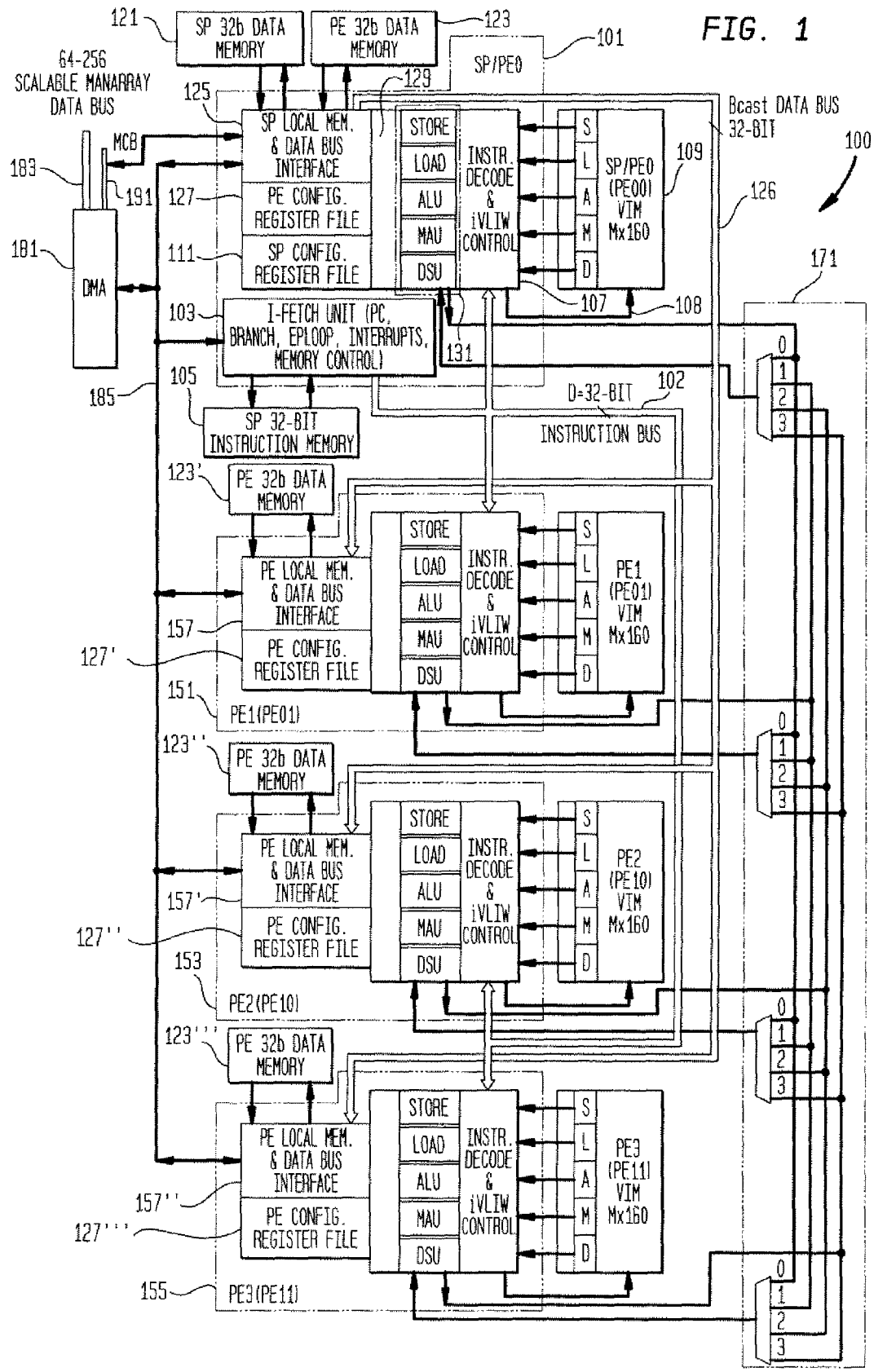
FIG. 1 illustrates an exemplary ManArray DSP and DMA subsystem appropriate for use with this invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/471,217 filed Dec. 23, 1999, now U.S. Pat. No. 6,260,082, U.S. patent application Ser. No. 09/472,372 filed Dec. 23, 1999, now U.S. Pat. No. 6,256,683, U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999, U.S. patent application Ser. No. 09/432,705 filed Nov. 2, 1999, U.S. patent application Ser. No. 09/596,103 filed Jun. 16, 2000, U.S. patent application Ser. No. 09/598,567 filed Jun. 21, 2000, U.S. patent application Ser. No. 09/598,564 filed Jun. 21, 2000, U.S. patent application Ser. No. 09/598,566 filed Jun. 21, 2000, U.S. patent application Ser. No. 09/598,558 filed Jun. 21, 2000, U.S. patent application Ser. No. 09/598,084 filed Jun. 21, 2000, U.S. patent application Ser. No. 09/599,980 filed Jun. 22, 2000, U.S. patent application Ser. No. 09/711,218 filed Nov. 9, 2000, U.S. patent application Ser. No. 09/747,056 filed Dec. 12, 2000, U.S. patent application Ser. No. 09/853,989 filed May 11, 2001, U.S. patent application Ser. No. 09/886,855 filed Jun. 21, 2001, U.S. patent application Ser. No. 09/791,940 filed Feb. 23, 2001, U.S. patent application Ser. No. 09/792,819 filed Feb. 23, 2001, U.S. patent application Ser. No. 09/792,256 filed Feb. 23, 2001, U.S. patent application Ser. No. 10/013,908 titled "Methods and Apparatus for Efficient Vocoder Implementations" and filed Oct. 19, 2001, Provisional Application Ser. No. 60/251,072 filed Dec. 4, 2000, Provisional Application Ser. No. 60/281,523 filed Apr. 4, 2001, Provisional Application Ser. No. 60/283,582 filed Apr. 13, 2001, Provisional Application Ser. No. 60/287,270 filed Apr. 27, 2001, Provisional Application Ser. No. 60/288,965 filed May 4, 2001, Provisional Application Ser. No. 60/298,624 filed Jun. 15, 2001, Provisional Application Ser. No. 60/298,695 filed Jun. 15, 2001, Provisional Application Ser. No. 60/298,696 filed Jun. 15, 2001, Provisional Application Ser. No. 60/318,745 filed Sep. 11, 2001, all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown, in FIG. 1 may be adapted as described further below for use in conjunction with the present invention. Processor 100 comprises a sequence processor (SP) controller combined with a processing element-0 (PE0) to form an SP/PE0 combined unit 110, as described in further detail in U.S. patent application Ser. No. 09/169,072 entitled "Methods and Apparatus for Dynamically Merging an Array Controller with an Array Processing Element". Three additional PEs 151, 153, and 155 are also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of "short" instruction words (SIW) or abbreviated-instruction words from a B-bit instructional memory 105, where B is determined by the application instruction-abbreviation process to be a reduced number of bits representing ManArray native instructions and/or to contain two or more abbreviated instructions as described in the present invention. If an instruction abbreviation apparatus is not used then B is determined by the SIW format. The fetch controller 103 provides the typical functions needed in a programmable processor, such as a program counter (PC), a branch capability, eventpoint loop operations (see U.S. Provisional Application Ser. No. 60/140,245 entitled. "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function, for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW instruction memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", now U.S. Pat. No. 6,023,753, and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

The present invention includes techniques for video decoding. A decoder in accordance with the present invention may be suitably implemented on a processor, such as the system 100 described above. The present invention utilizes a decoder flow based on operating the decoder in multiple stages exploiting SIMD parallelism. Improved scalability and efficiency may be obtained by utilizing multiple PEs operating in SIMD mode, where each PE executes the same processing task but operates on different sets of data. The effect of data transfers between SDRAM and the PEs may be significantly reduced using ping-pong buffers. The ping-pong buffers allow a PE to operate on data in a first buffer while data transfers occur utilizing the second buffer. Then, the PE operates on data in the second buffer while data transfers occur utilizing the first buffer. Additionally, using large blocks of data for the data transfers reduces the overhead involved in setting tip the transfers by reducing the total number of necessary transfers for data from contiguous addresses which make up the blocks. A decoder in accordance with the present invention may process data units of a picture frame in macroblocks. One macroblock consists of four luminance blocks and two chrominance blocks, with each block comprising an 8×8 array of pixels. Intra coding for a frame or a macroblock (I frame) utilizes information only from the frame or macroblock itself, and does not use data from other frames. Inter coding for a frame or macroblock (P frame) utilizes a previous reference frame to predict the data in the current frame. According to the MPEG4 standard, an I frame contains only intra coded macroblocks, namely data which is encoded without temporal prediction. P frames in the MPEG4 standard contain primarily macroblocks inter coded, meaning they use the temporal prediction. However, P frames may also contain some intra coded macroblocks when temporal prediction gives poor result. The high compression ratios in video coding rely generally on the successful usage of temporal prediction as intra coded data never achieves compression ratios as high as inter coded data.

At low bit rates, a large number of macroblocks in P frames have no coded data (motion vectors and prediction errors) in the bitstream. The MPEG standard requires that these macroblocks be copied directly from the reference frame during the decoding process. Thus, no processing needs to be performed and these macroblocks should be replaced in the reconstructed frame with the corresponding macroblocks from the reference frame. A copy of the reference frame is made under host control into the SDRAM area where the reconstructed frame will be placed in order to avoid data transfer from SDRAM to the DSP and back to SDRAM without any DSP processing of the not coded macroblocks. The copy is made prior to DSP starting to process the frame, thus allowing not coded macroblocks to be omitted by DSP processing. In the reconstructed framed, the not coded data is already present, as it was copied by the host.

Processor tasks to perform video decoding are separated between PEs to achieve SIMD processing of data to reduce the amount of time a given PE is idle. While in a preferred embodiment variable length decoding (VLD) is performed on a host system, as the VLD is a basically a sequential task, it is within the spirit of the present invention for the VLD to be performed on the SP without involving PEs. In an alternative embodiment when multiple video streams are available for decoding, the VLD can be performed utilizing one stream per PE one or more PEs. After VLD is performed, a series of tables, or arrays, containing the variable length decoded information are stored in SDRAM and used by the PEs for further processing. As described in greater detail below, these tables comprise one table containing macroblock types, with 1 byte per macroblock, showing the type of macroblock encoding and including 396 bytes for a common intermediate format (CIF) frame. Another table shows the quantization parameter (QP) values for each macroblock, and includes 1 byte per macroblock and 396 bytes for a CIF frame. Two tables contain decoded motion vectors differences for x and y motion components, and include 4 halfwords per macroblock for each 2*4*396 half words for CIF frame. Another array contains the DCT decoded coefficients, and includes 64 half words per block and 6*64*396 half words for a CIF frame.

As described in greater detail below, processing tasks which may be performed utilizing SIMD mode are performed in parallel on PEs for the data which undergo the same processing stage. Also, the task separation is operable to avoid or minimize idle times for PEs. The decoding flow is divided into three processing stages. Each stage is executed for all macroblocks or blocks of data in the frame which should go through that stage, based on the coding type, before going to the next processing stage. Thus, macroblocks or blocks of data are not necessarily processed in sequential order, as opposed to the standard decoder where macroblocks are always processed in sequential order. The processing stages include stage I which involves the decoding of intra-macroblocks, with one macroblock per PE. If the full frame is intra coded, the processing ends with Stage I. In stage II, decoding texture for inter coded macroblocks is performed utilizing one 8×8 block per PE. Texture denotes the temporal prediction errors, or in other words, the data which gets encoded using DCT and quantization. In stage III, motion compensation and frame reconstruction are performed utilizing one 8×8 block per PE. Stage I is separated into two program flows: a complex flow decoding MPEG-4 sequences including the reconstruction of DC and AC coefficients from prediction, and a simple flow for decoding sequences with a short video header, such as H.263 sequences.

Additionally, the present invention provides for faster processing by merging the processing of two blocks. The inverse scan and dequantization are merged in a single of procedure operating in SIMD mode on PEs. Data is loaded from the input block sequentially into packed groups of 4 halfwords, processed and stored in packed groups of 4 elements. The indices used for loading data, or inverse scan indices, are obtained from either of three tables, corresponding to the three different scan orders. The table is selected for each block based on a DC gradient value, as defined by the video decoding standard.

Figure 1A:
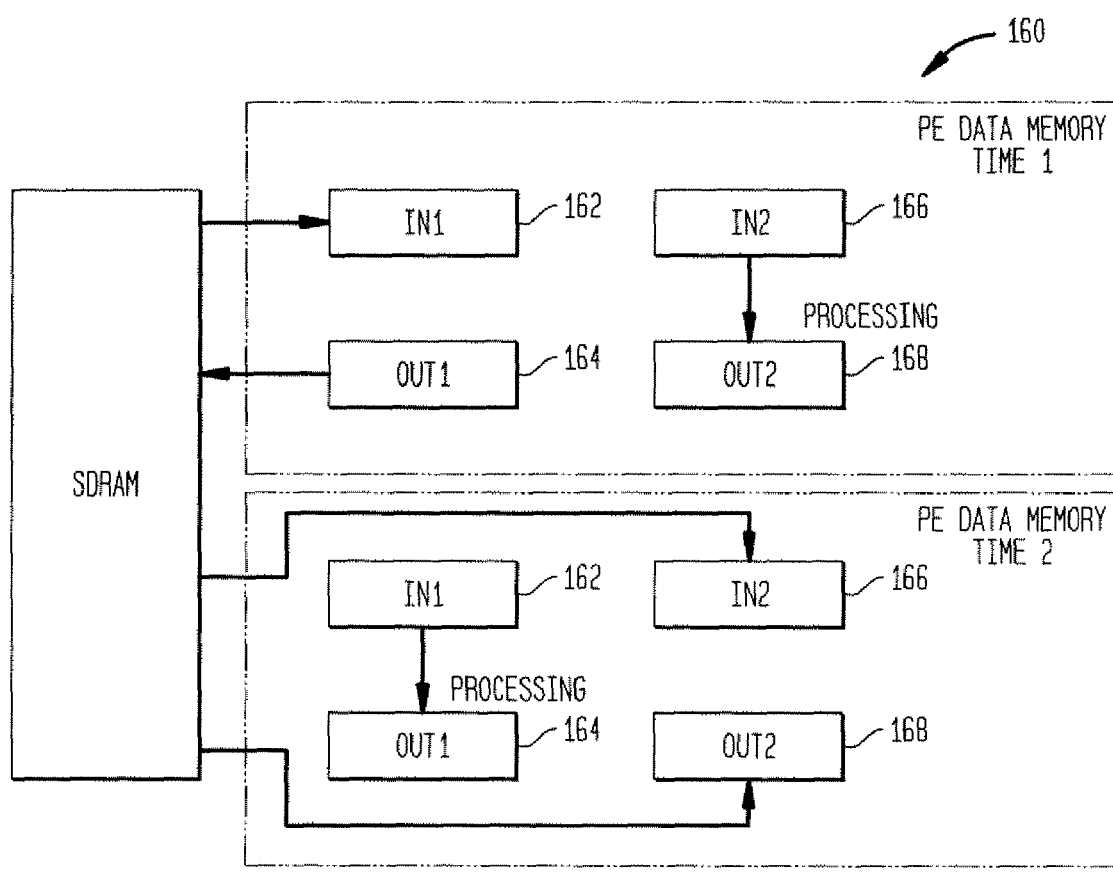
FIG. 1A shows a diagram of dual input and output buffers in accordance with the present invention.

In one aspect, the present invention allows the effect of DMA transfers between SDRAM and PEs to be minimized by through the use of two pairs of input/output buffers, or ping-pong buffers, as shown in block diagram 160 of FIG. 1A. Hiding the DMA behind the computation is performed by using the two pairs of input/output buffers such that one pair is involved in data transfers and the other in the computation. The DMA may utilize two channels, or lanes, which perform independent transfers. A first lane, lane 0, may be used to transfer data from SDRAM to the DSP, and a second lane, lane 1, may be used to transfer data from the DSP to SDRAM. As seen in the example shown in FIG. 1A, during a first time period, the buffers 162 and 164 are being used for data transfers, while buffers 166 and 168 are used for processing. During a second time period, the buffers 166 and 168 are being used for data transfers, while buffers 162 and 164 are used for processing.

Figure 2A:
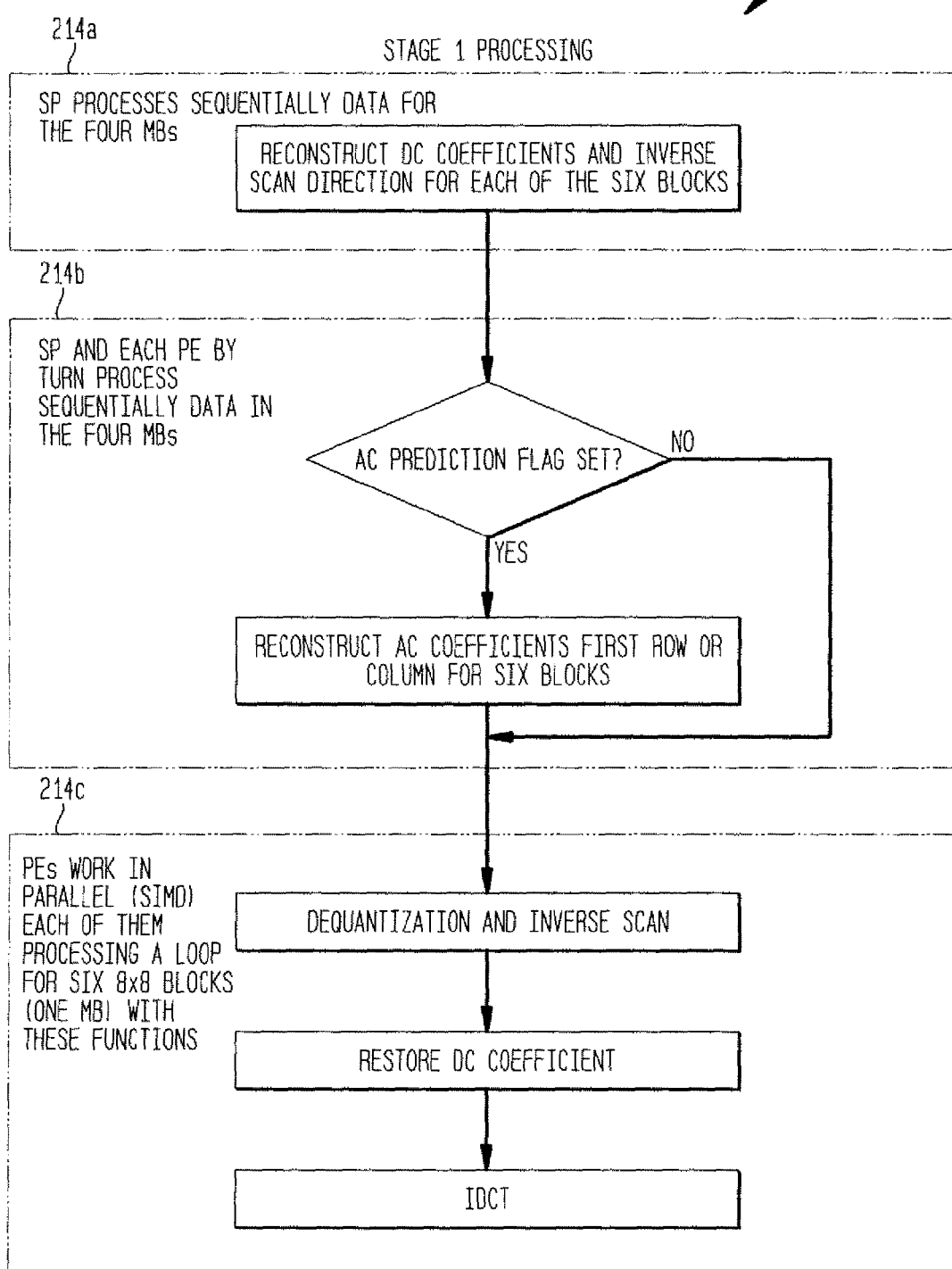

FIG. 2 shows a method 200 of stage I decoding intra macroblocks in accordance with the present invention. In step 202, the first four intra coded macroblocks are selected from a list of byte codes. Four macroblocks are selected to allow each PE of a 2×2 array to process one macroblock. In step 204, the DMA transfer from SDRAM to the PEs is initiated for lane 0, with one macroblock (MB) per PE being transferred to a first input buffer, allowing one macroblock to be processed by each PE. In step 206, the next four intra coded macroblocks are selected. In step 208, a determination is made if there are any more intra macroblocks in the list. If there are more intra macroblocks, the method continues to step 210. If there are not any more intra macroblocks in the list, the method continues to step 214. In step 210, the DMA for lane 0 is halted and the input buffer address is updated to point to a second input buffer, as described above in greater detail with respect to FIG. 1A. In step 212, the DMA transfer from SDRAM to PEs is initiated for lane 0, with 1 macroblock per PE being transferred. In step 214, six 8×8 blocks are processed by each PE, as described in greater detail below with respect to FIG. 2A. In step 216, the processed six 8×8 blocks are packed as one 16×16 block and two 8×8 blocks. In step 218, a determination is made if the first group of macroblocks is being processed or if there is already processed data which is being transferred to SDRAM. This determination is needed in order to wait for the completion of such a transfer. When the first group of macroblocks is being processed, there is no need to wait for such a transfer. If the first group of macroblocks is being processed, the method continues to step 222. If there is already processed data which is being transferred to SDRAM, the method continues to step 220. In step 220, the DMA for lane 1 is halted and the output buffer address is updated to point to a second output buffer. In step 222, the DMA transfer of the processed video from the PEs to SDRAM is initiated for lane 1 utilizing a first output buffer. In step 224, a determination is made if more processing is to occur with further macroblocks remaining to be processed. If more processing is to occur, the method continues at step 206. If more processing is not to occur, the method continues at step 226. In step 226, the DMA for lane 1 is halted.

FIG. 2A shows further detail of the step 214 of method 200 in accordance with the present invention. In step 214a, DC coefficients are reconstructed and a determination is made as to which of the three scan patterns is to be used for the inverse scan of each of the six 8×8 blocks. Due to the sequential nature of the encoding, the SP processes data sequentially for each of the four macroblocks. The step 214a is not performed for short video header sequences according to H.263. In step 214b, a check is made for the AC prediction flag. The AC prediction flag indicates if a macroblock uses AC prediction. If the AC prediction flag is set, the AC coefficients of first row or column for six blocks of the macroblock are reconstructed. The PEs jointly in parallel process data from the four macroblocks, with each PE sequentially processing data from one of the four macroblocks. The sequential processing is required by sequential data dependencies. The step 214b is performed on the PEs because data is loaded in the PEs for the next processing steps, which will be performed in parallel. The step 214b is not performed for short video header sequences according to H.263. In step 214c, dequantization and inverse scan are performed on each block. Additionally the DC coefficients are restored and an inverse discrete cosine transform (IDCT) is performed. For the processing of step 214c, the PEs operate in SIMD mode, with each PE processing a loop for six 8×8 blocks (1 macroblock).

Figure 3:
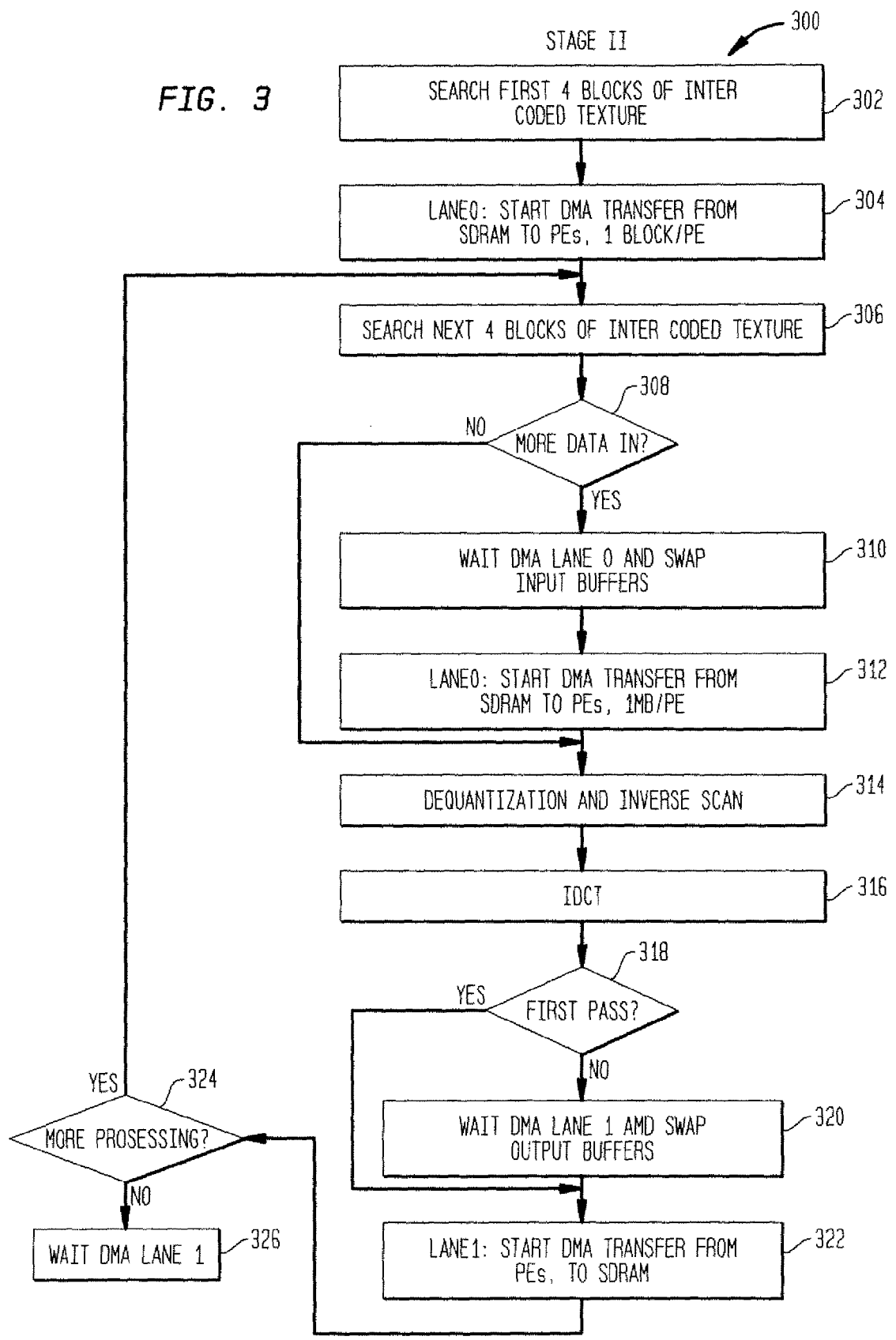
FIG. 3 shows a method of decoding texture for inter coded macroblocks in accordance with the present invention.

FIG. 3 shows a method 300 of stage II decoding texture for inter coded macroblocks in accordance with the present invention. In step 302, the first four blocks of inter coded texture are selected from a list of byte codes. In step 304, the DMA transfer from SDRAM to the PEs is initiated for lane 0, with one block per PE being transferred to a first input buffer. In step 306, the next four inter blocks of inter coded texture are selected. In step 308, a determination is made of whether there are any more inter coded blocks in the list. If there are more inter coded blocks, the method continues to step 310. If there are not any more inter coded blocks, the method continues to step 314. In step, 310 the DMA for lane 0 is halted and the input buffer address is updated to point to a second input buffer. In step 312, the DMA transfer from SDRAM to PEs is initiated for lane 0, with 1 block per PE being transferred. In step 314, dequantization and inverse scan are performed on the blocks. In step 316, IDCT is performed on the blocks. In step 318, a determination is made if the first group of blocks is being processed or if there is already processed data which is being transferred to SDRAM. If the first group of blocks is being processed, the method continues to step 322. If there is already processed data which is being transferred to SDRAM, the method continues to step 320. In step 320, the DMS for lane 1 is halted and the output buffer address is updated to point to a second output buffer. In step 322, the DMA transfer of the processed video from the PEs to SDRAM is initiated. In step 324, a determination is made if more processing is to occur with further macroblocks remaining to be processed. If more processing is to occur, the method continues at step 306. If more processing is not to occur, the method continues at step 326. In step 326, the DMA for lane 1 is halted.

Figure 4:
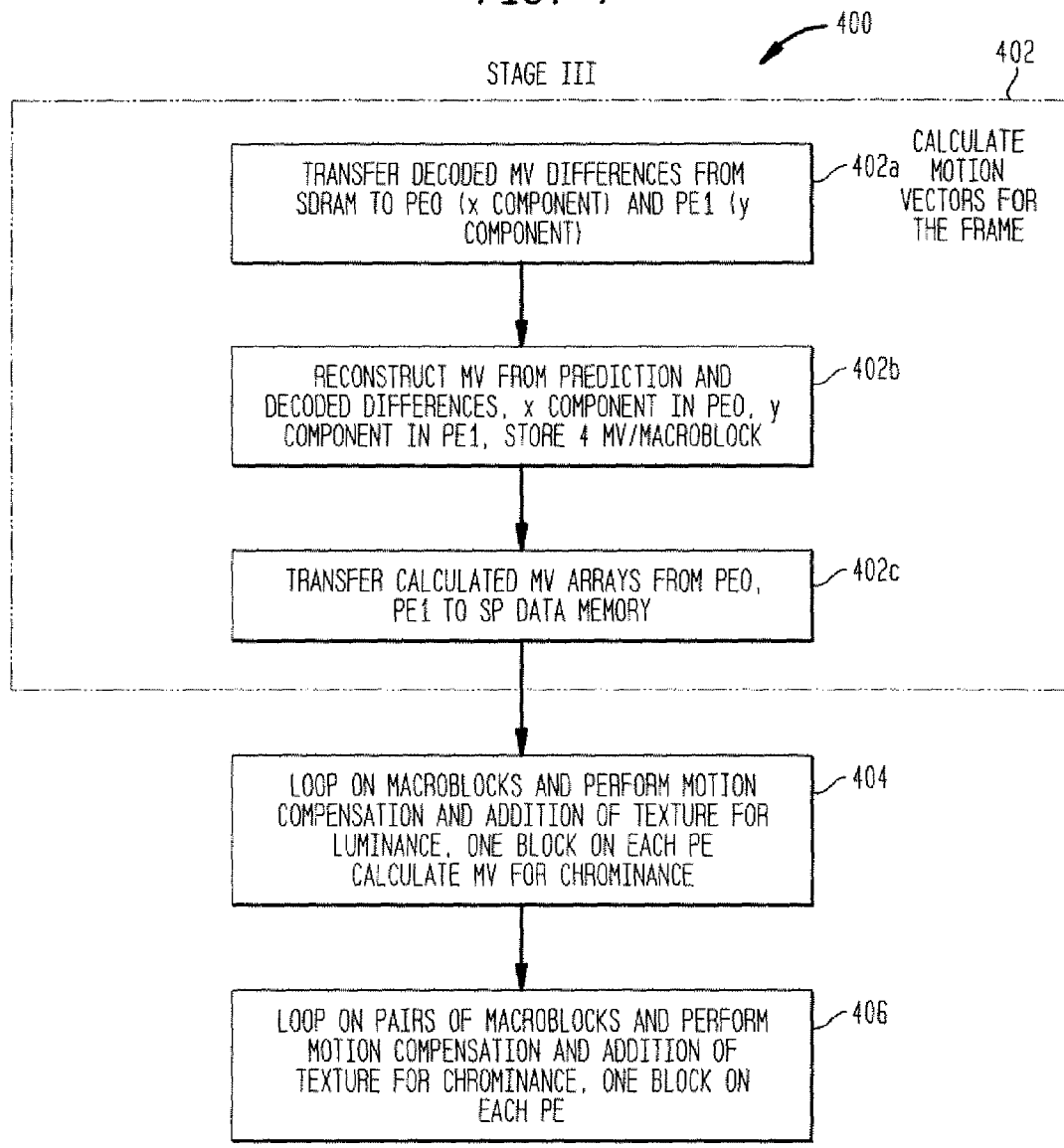
FIG. 4 shows a method of motion compensation and frame reconstruction in accordance with the present invention.

FIG. 4 shows a method 400 of stage III motion compensation and frame reconstruction in accordance with the present invention. The method 400 describes processing related to motion vectors and motion compensation for a full frame. In step 402, motion vectors are calculated for a frame utilizing prediction. In step 402a, decoded motion vector differences for the x-component and y-component of the motion vector are transferred from SDRAM to PE0 and PE1, respectively. In step 402b, the motion vector is reconstructed from prediction and decoded differences, with PE0 operating on the x-component and PE1 operating on the y-component. After the motion vectors are reconstructed, the motion vectors are transferred to the SP and stored in SP data memory to be used further for motion compensation calculation. Further detail of motion vector reconstruction are provided in FIG. 6 and described in greater detail below. In step 404, the SP browses the macroblock types list to find inter coded macroblocks and motion compensation is performed. With four luminance blocks in a macroblock, the motion compensation is performed by each PE processing one luminance block. Motion compensation includes selecting a block of data from a previous frame whose address needs to be calculated using motion vectors, and performing interpolation on that block. Additionally, the motion vector for chrominance is calculated. Step 404 loops until all macroblocks have been processed, and is described in greater detail below with respect to FIG. 5. In step 406, motion compensation is performed and texture is added for chromaticity. The two chromaticity blocks in each macroblock is processed by two PEs. Four PEs perform motion compensation for chromaticity on a pair of macroblockks. Step 406 loops until all pairs of macroblocks have been processed.

The motion compensation for chrominance is performed using the same functions and flow as the luminance with the exception that the four blocks processed simultaneously on PEs come from two different macroblocks, PE0 and PE1 process color blocks for the first macroblock, while PE2 and PE3 process color blocks for the second macroblock.

Figure 5:
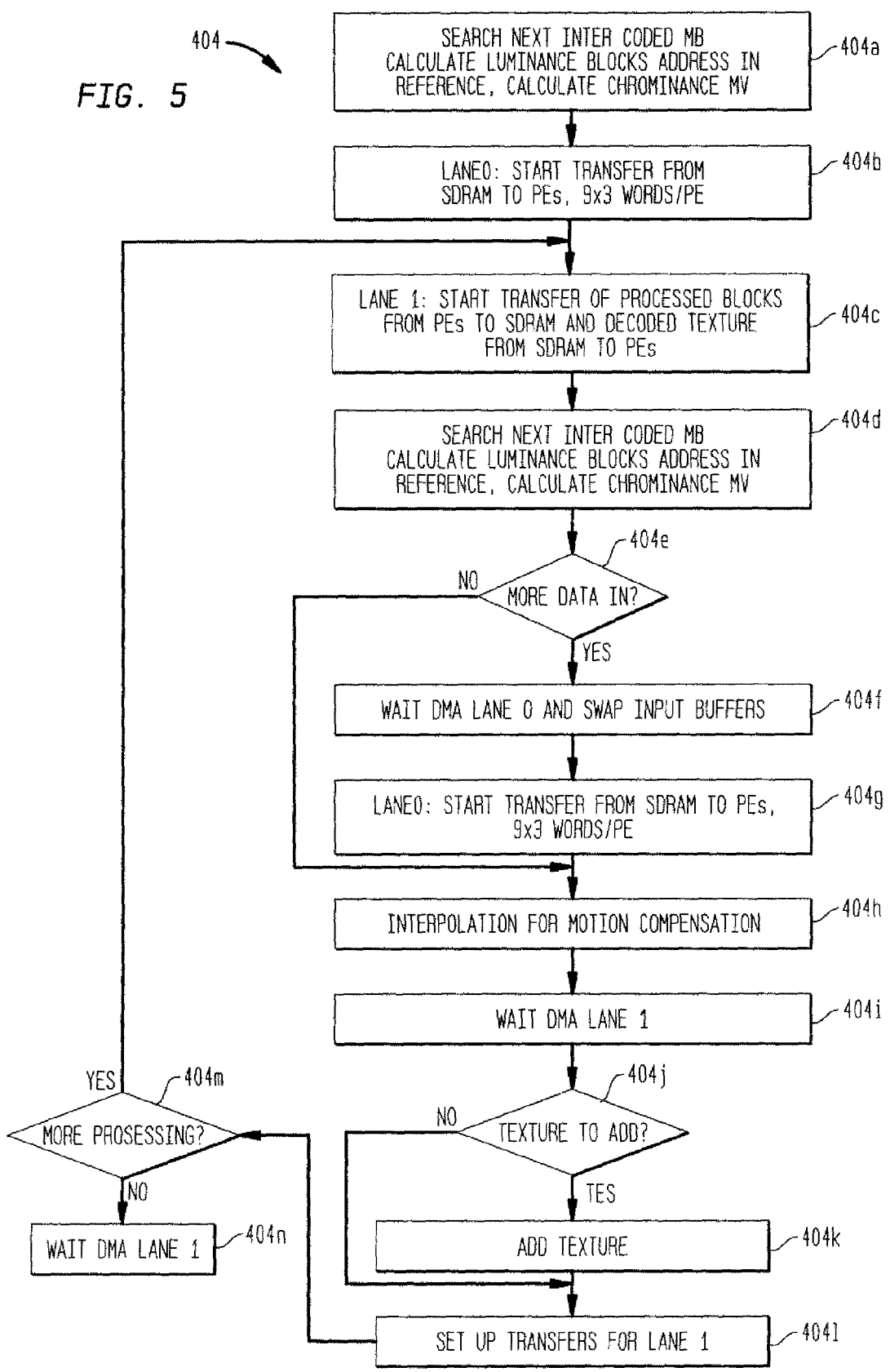
FIG. 5 shows further details of a method of motion compensation and frame reconstruction in accordance with the present invention.

FIG. 5 shows further details of the step 404 of method 400 in accordance with the present invention. In step 404a, an inter coded macroblock is selected and a chrominance motion vector is calculated by averaging the motion vectors of the four luminance blocks of the macroblock. In step 404b, the DMA transfer from SDRAM to PEs is initiated for lane 0, with 9×3 words or 9×12 bytes being transferred to a first input buffer. In step 404c, the DMA transfer of processed blocks from PEs to SDRAM is initiated for lane 1, and the DMA transfer of decoded texture from SDRAM to PEs is initiated for lane 0. In step 404d, the next inter coded macroblock is selected and a chrominance motion vector is calculated by averaging the motion vectors of the four luminance blocks of the macroblock. In step 404e, a determination is made of whether there are any more inter coded macroblocks in the list. If there are not any more inter coded macroblocks, the method continues to step 404h. If there are more inter coded macroblocks, the method continues to step 404f. In step 404f, the DMA for lane 0 is halted and the input buffer address is updated to point to a second input buffer. In step 404g, the DMA transfer from SDRAM to PEs is initiated for lane 0, with 9×3 words or 9×12 bytes being transferred. In step 404*h*, interpolation for motion compensation is performed. In step 404*i*, the DMA for lane 1 is halted. In step 404*j*, a check is made of whether there is more texture to add. If there is more texture to add, the method continues to step 404*k*. If there is not more texture to add, the method continues to step 404*l*. In step 404*k*, texture is added in step 404*l*, the DMA transfers for lane 1 are set up. In step 404*m*, a determination is made if more processing is to occur. If more processing is to occur, the method continues to step 404*c*. If more processing is not to occur, the method continues to step 404*n*. In step 404*n*, the DMA for lane 1 is halted.

The present invention advantageously utilizes a macroblock type code, comprising bits b7-b0, which is included in the host decoding of VLD to allow the presentation of needed macroblock type data in a byte format. Bits b1 and b0 show the type of encoding:

00—not coded MB
    01—Intra coded MB
    10—Inter coded MB, 1 motion vector
    11—Inter coded MB, 4 motion vectors Bit b7, for intra coded macroblocks, indicates if AC prediction of coefficients is used:

MB_type=0x01—no AC prediction
    MB_type=0x81—AC prediction used

Bits b7-b3, for inter coded macroblocks, indicate the blocks having coded texture:

MB_type=0x02—no block has coded texture
    MB_type=0xfe—all blocks have coded texture
    MB_type=0xc7—MB coded inter, 4 MV, 2 blocks have encoded texture An example of macroblock types sequence in an MPEG-4 I frame includes: 0x81, 0x81, 0x01, 0x81, 0x81 and 0x81. An example of macroblock types sequence in an MPEG-4 P frame includes: 0x00, 0x00, 0x02, 0x02, 0xc2, 0xb2, 0x07, 0x02, 0x01 and 0x00.

Figure 6:
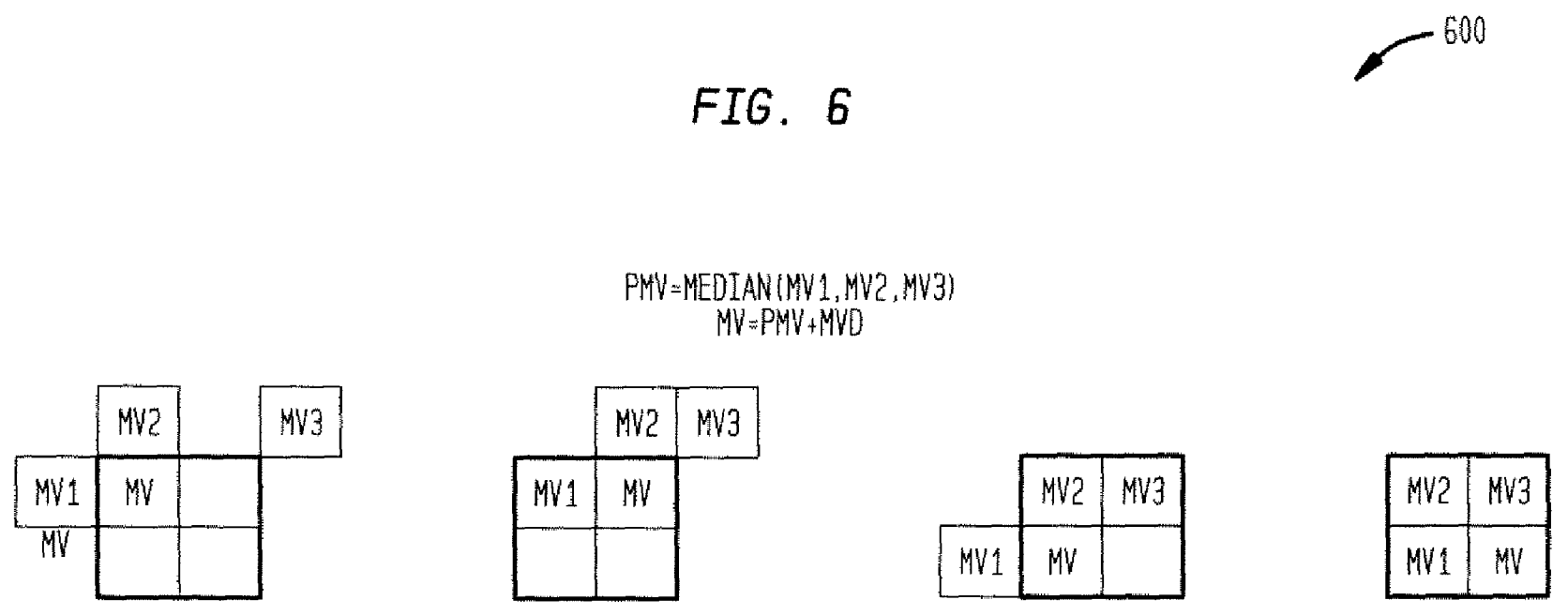

Motion vectors for luminance blocks are reconstructed as the sum between predictors calculated using neighboring blocks vectors (PMV) and the differences decoded from the stream (MVD), as shown in diagram 600 of FIG. 6. This operation is performed for the full frame in the beginning of the third stage utilizing one or four motion vectors per macroblock. For each block, the predictor is the median of the motion vectors of three neighboring blocks, which are different for the different block positions in the macroblock, as defined in the MPEG-4 standard. When there is only one motion vector, the result for the first block is copied into the other three positions as well. PE0 and PE1 operate to calculate simultaneously the motion vector components x and y.

Figure 7:
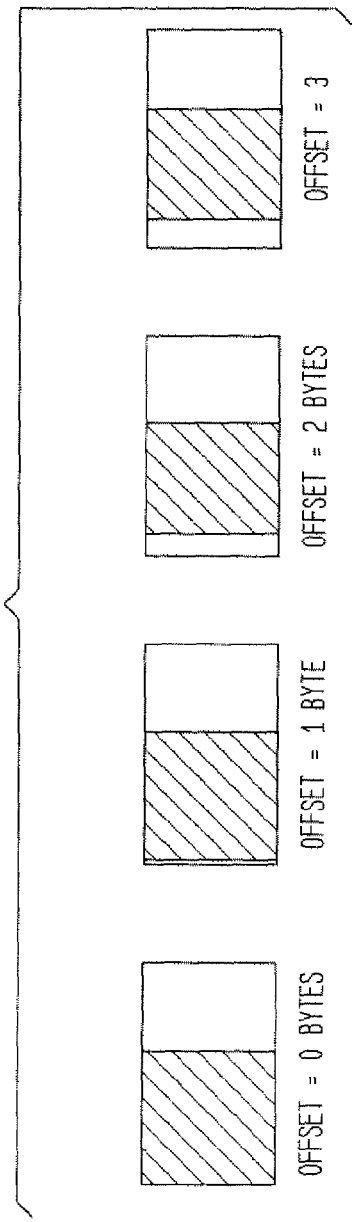
FIGS. 7 and 8 show diagrams of data alignment in accordance with the present invention.
Figure 8:
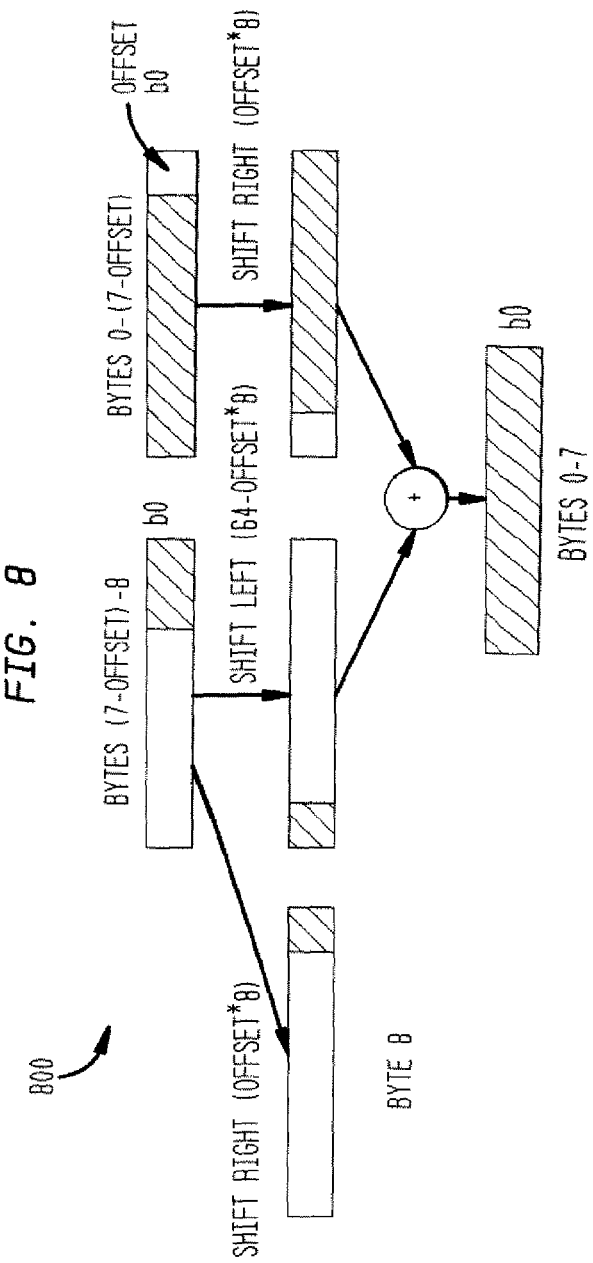

Data alignment may be utilized to compensate is there is a lack of byte aligned access. In a preferred embodiment, a 9×9 block from the reference frame is needed for motion compensation. Due to DMA and data access restrictions, a 9×12 bytes block is transferred from the reference frame in a 9×16 byte block in PE Data Memory. The position of the desired 9×9 block may be such as shown in diagram 700 of FIG. 7. The alignment function is implemented to shift the data in the input block such that the offset is zero for the first byte. The data alignment function may be implemented using shifts as shown in diagram 800 of FIG. 8. For a system operable with byte aligned DMA, this data alignment is not utilized.

In MPEG-4 motion vectors are allowed to point anywhere in the reference frame, including on the borders. Some samples referenced by motion vectors stay outside the reference frame. When this occurs, an edge sample has to be used. In terms of processing this means checking for each block transferred from the reference if it is completely inside the frame. If the block has some samples outside the frame, those samples need to be replaced with the closest frame border values. The function to achieve this is implemented as a sequential function, running on one PE at a time, with one PE enabled and the others are disabled, before the interpolation.

The present invention includes a motion compensation procedure to accommodate all four types cases: integer, half x, half y' and half x,y. The motion compensation runs when PEs process blocks with different motion vectors, such as the case of luminance for macroblocks with four motion vectors, and the case of chrominance, where blocks from two different macroblocks are processed simultaneously. The interpolation may use mean2 and mean4 instructions. The result is selected between the mean2 for integer and half y, and mean4 for half x and half x,y. The rounding/truncation option for the mean instructions is based on the rounding_type parameter which may be switched on/off at every new frame. The VLIW instructions affected by this change are reloaded at each new frame. One embodiment of the interpolation function for rounding_type=0 contains one loop with 4 VLIWs executed 7 times, and additional 10 initialization instructions and 3 post-loop instructions. In the case of rounding_type=1, the loop contains one more instruction and there is also one more initialization instruction. It takes 48 or 56 cycles to run the function, including the eploop, call and ret cycles.

However, the interpolation technique may not be optimal if all motion vectors are the same, such as the case of luminance blocks for macroblocks having only one motion vector. Then a different technique is applied, best fit to the interpolation case, and the number of cycles for computation is lowered. Seven VIM locations may be used to implement all types of interpolation.

The addition of residuals function achieves the addition of decoded texture to motion compensated 8×8 blocks and clipping the result in a 0-255 range, and is executed if at least one of the 4 motion compensated blocks needs texture added. The PEs containing blocks which do not add texture are disabled during this execution. The bytes of motion compensated blocks are unpacked to half words, the half words of decoded texture are added, and the clipping is performed using min and max operations and the result is packed back to byte form and stored. The optimized version contains one loop with four VLIWs executed seven times, and additional 11 initialization instructions and 3 post-loop instructions. In one aspect of the present invention, it takes 49 cycles to run the function, including the eploop, call and ret cycles.

The present invention includes an inverse scan and dequantization technique which may be merged in a single of procedure running SIMD on the PEs. The inverse scan determines the way one dimensional data (64 values per block) are converted into a two dimensional array (8×8) before dequantization and IDCT. Data is loaded from the scrambled input block sequentially into packed groups of 4 halfwords, processed and stored in packed groups of 4 elements. The indices used for loading data, or inverse scan indices, are obtained from one of three tables corresponding to the three different scan orders. The table is either the zig-zag de-scan or selected for each intra block based on a DC gradient value, as defined by the MPEG-4 standard.

The C function code corresponding to assembly implementation is:

```
DequantH263(short *qcoeff, short *rcoeff, int *inv_scan, byte QP)
{
short i,k, v, lim;
lim = (1 << (bits_per_pixel + 3));
for (i = 0; i < 64; i++)
    {
    v = qcoeff[inv_scan[i]];
    v = MIN(2047, MAX(-2048, v ));
    if((QP % 2) == 1)
        rcoeff[i] = QP * (2*ABS(v) + 1);
    else
        rcoeff[i] = QP * (2*ABS(v) + 1) - 1;
    rcoeff[i] = SIGN(v) * rcoeff[i];
    if(v ==0)
        rcoeff[i] = 0;
    if(QP==0)
        rcoeff[i] = v;
    rcoeff[i] = MIN(lim-1, MAX(-lim, rcoeff[i] ));
    }
}
```

For an assembly language implementation, a copys instruction may be used to implement if clauses and the sign adjustment. The sequential assembly version may contain a loop of 33 instructions executed 16 times and having an 6 additional initialization instructions. The optimized version uses 22 VLIWs and contains a loop of 28 instructions executed 8 times, with an additional overhead of 20 initialization instructions. In a preferred embodiment, 252 cycles are used for a dequantization of a block including the eploop, call and ret cycles.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. A video decoding method employing a plurality of processing elements (PEs) comprising:
accessing under control of each PE a plurality of macroblocks comprising a reference video frame;
decoding in a first stage a first portion of the plurality of macroblocks having an associated coding type indicating that the first portion includes all intra coded macroblocks of the reference video frame, wherein each PE decodes an intra coded macroblock;
decoding texture in a second stage a second portion of the plurality of macroblocks, the second portion of the plurality of macroblocks having an associated coding type indicating that the second portion are inter coded macroblocks of the reference video frame, wherein each PE decodes a subcomponent of an inter coded macroblock; and
performing motion compensation and frame reconstruction in a third stage for the second portion of the plurality of macroblocks of the reference video frame, wherein each PE performs motion compensation on a subcomponent of an inter coded macroblock and wherein each stage is executed for all macroblocks of data in the reference video frame based on the associated coding type of the macroblocks, before the execution of the next stage.

2. The video decoding method of claim 1 further comprising:
controlling by a sequence controller (SP) the plurality of PEs to execute in single instruction multiple data (SIMD) mode.

3. The video decoding method of claim 1 further comprising:
holding video frames in a main memory from which macroblocks of selected video frames may be accessed by the DMA controller and distributed to local PE memories.

4. The video decoding method of claim 3 wherein the local PE memories comprise:
two pairs of input/output buffers associated with each PE, with one pair of buffers available for data transfers under control of the DMA controller while the other pair of buffers is available for data accesses by each PE.

5. The video decoding method of claim 1 wherein at least some of the plurality of macroblocks are not processed in sequential order.

6. The video decoding method of claim 1 wherein one macroblock is processed by each PE.

7. The video decoding method of claim 1 wherein the second stage and the third stage are not performed if an entire video frame comprises intra coded macroblocks.

8. The video decoding method of claim 1 wherein the first stage operates each PE to decode video sequences including reconstruction of direct current (DC) and alternating current (AC) coefficients from prediction and decode sequences with a short video header.

9. The video decoding method of claim 1 wherein the each macroblock is made up of a plurality of subcomponents and each subcomponent is an 8×8 block array of pixels.

10. The video decoding method of claim 1 wherein the plurality of PEs comprises four PEs arranged for single instruction multiple data (SIMD) processing.

11. The vide decoding method of claim 10 wherein each macroblock is made up of four luminance blocks and two chromaticity blocks.

12. The video decoding method of claim 11 further comprising:
performing on each PE in parallel a motion compensation procedure on a different one of the four luminance blocks of a macroblock on a macroblock by macroblock basis.

13. The video decoding method of claim 11 further comprising:
performing on the four PEs in parallel a motion compensation procedure for chromaticity on a pair of macroblocks.

14. A video processing system comprising:
a direct memory access (DMA) controller that distributes selected portions of a plurality of macroblocks comprising a reference video frame to a plurality of processing element (PE) local memories of the video processing system; and
a plurality of processing elements (PEs) that access a first portion of the plurality of macroblocks from the plurality of PE local memories and decode in a first stage of processing the first portion of the plurality of macroblocks having an associated coding type indicating that the first portion includes all intra coded macroblocks of the reference video frame,
access a second portion of the plurality of macroblocks from the plurality of PE local memories and decode texture of the second portion of the plurality of macroblocks in a second stage of processing, the second portion of the plurality of macroblocks having an associated coding type indicating that the second portion are inter coded macroblocks of the reference video frame, and perform motion compensation and frame reconstruction in a third stage of processing for the second portion of the plurality of macroblocks of the reference video frame, wherein the plurality of PEs perform SIMD dequantization on inverse scanned packed data elements as a single processing procedure operating on distributed data, and wherein the SIMD dequantization on inverse scanned packed data elements is performed by the PEs executing very long instruction words (VLIWs).

15. A video processing system comprising:

a direct memory access (DMA) controller that distributes selected portions of a plurality of macroblocks comprising a reference video frame to a plurality of processing element (PE) local memories of the video processing system; and a plurality of processing elements (PEs) that access a first portion of the plurality of macroblocks from the plurality of PE local memories and decode in a first stage of processing the first portion of the plurality of macroblocks having an associated coding type indicating that the first portion includes all intra coded macroblocks of the reference video frame, access a second portion of the plurality of macroblocks from the plurality of PE local memories and decode texture of the second portion of the plurality of macroblocks in a second stage of processing, the second portion of the plurality of macroblocks having an associated coding type indicating that the second portion are inter coded macroblocks of the reference video frame, and perform motion compensation and frame reconstruction in a third stage of processing for the second portion of the plurality of macroblocks of the reference video frame, wherein the plurality of PEs perform SIMD dequantization on inverse scanned packed data elements as a single processing procedure operating on distributed data, and wherein the single processing procedure operates each PE to load data from an input buffer sequentially into packed groups of four halfwords, to process the packed groups for dequantization, and to store the processed data in groups of four elements to an output buffer.

* * * * *